(No Model.)
D. P. ANDRUS.
ELECTRIC BELT.
No. 449,345.        Patented Mar. 31, 1891.
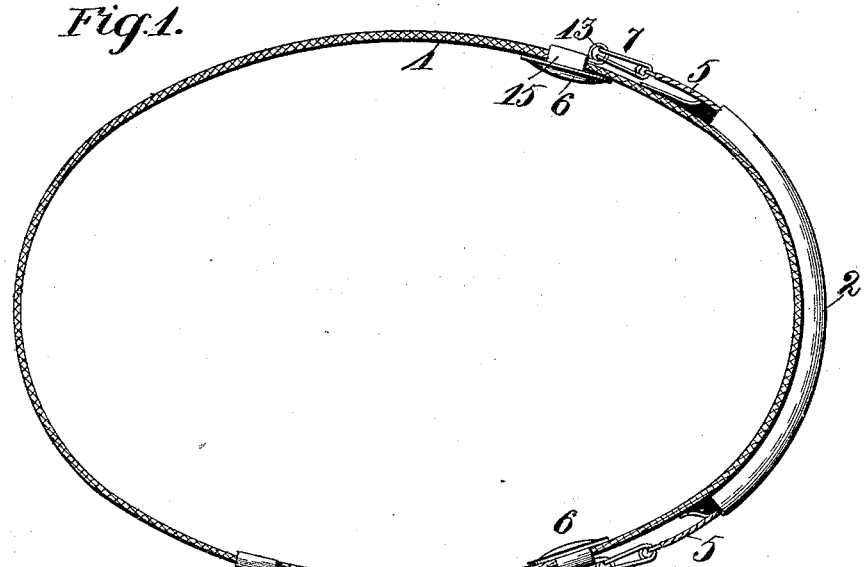
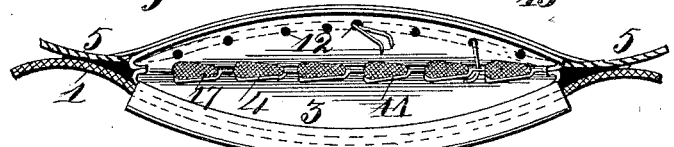
 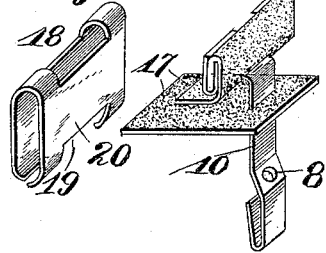 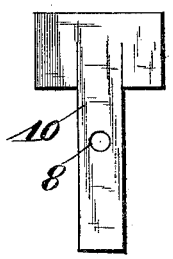
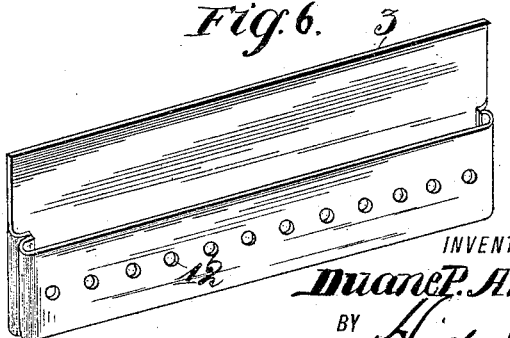
WITNESSES:
INVENTOR
Duane P. Andrus,
BY Hayden & Hayden
ATTORNEYS.

UNITED STATES PATENT OFFICE.

DUANE P. ANDRUS, OF ST. LOUIS, MISSOURI.

ELECTRIC BELT.

SPECIFICATION forming part of Letters Patent No. 449,345, dated March 31, 1891.

Application filed November 7, 1890. Serial No. 370,680. (No model.)

*To all whom it may concern:*

Be it known that I, DUANE P. ANDRUS, of the city of St. Louis and State of Missouri, have invented certain new and useful Improvements in Electro-Galvanic Belts, of which the following is a full, clear, and exact description, reference being had to the accompanying drawings, forming a part hereof.

My invention relates to improvements in electro-galvanic belts; and it consists in the novel arrangement and combination of parts, as will be more fully hereinafter described, and designated in the claims.

In the drawings, Figure 1 is a top plan view of my invention in a position to be applied to the body. Fig. 2 is a top plan view of the inner rubber casing with a galvanic battery located therein and suitable connection attached to said battery. Fig. 3 is a longitudinal section of the galvanic battery which I employ in carrying out my invention. Fig. 4 is a perspective view of the zinc plate of one of the cells of said battery. Fig. 5 is a perspective view of the copper plate of the same with a dielectric absorbent material attached thereto in position to be folded. Fig. 6 is a perspective view of the inner rubber casing for the battery detached. Fig. 7 is a plan view of a blank for the copper plate 10.

Referring to the drawings, 1 represents the band itself, adapted to pass around the body, and has attached to it on the outside thereof, one or more pockets 2. Located in this outer case or casings, as the case may be, are inner rubber or water-proof casings 3. Said rubber case or casings are used to prevent the fluid used in generating the electrical energy from percolating through and soiling the clothes and coming in contact with the body. In this case or casings the source of electrical energy or the galvanic battery or batteries 4 are located. The battery or batteries, as the case may be, are charged with some oxidizable exciting-fluid, acetic acid or acidulated water. The water-proof condition of the inner casing, as above stated, will prevent the liquid from dripping through and soiling the belt or clothes. The galvanic positive and negative electric current thus generated is conducted to any portion of the body desired by the conducting cord or cords 5, attached, respectively, to the positive and negative poles of said battery or batteries and also to the contact-piece or electrode 6, which are adapted to receive a quantity of electricity that is conducted to and condensed in the electrodes. These cords are put in electrical continuity with the battery by means of small spring-hooks 7, which are in electrical contact with the conducting cord or cords. The bent ends of said hooks are clasped together and are inserted in perforations 8 made in the copper plates 10 of the cells 11. The elastic condition of said springs, which is achieved by the median portion being bent in a coil, will cause the bent portion or hooks thereof to expand and directly impinge against the sides of said perforations, and thereby form good electrical connection. These spring-hooks pass through perforations 12, made in the inner rubber casing, and then are properly fastened, as above stated, in perforations 8 in the copper plate of the cell.

The conducting-cords 5 pass one from positive and one from negative pole of the battery to an electrode or contact-piece 6, where a small spring-hook electrically connected to said cords passes through an eye 13, formed on the end of the wire 14, which is suitably connected to the electrode or contact-piece, the latter being held upon the band 1 of the belt in any desired position by the clip 15, which is secured to the former and encircles the latter.

The galvanic battery is composed of a series of cells of oxidizable and conducting metal—zinc and copper.

10 represents the T-shaped copper plate out of which the copper part of the cell is constructed. The upper part of the T-shaped copper plate is rolled, doubled, or folded on itself, with a layer or stratum of some dielectric absorbing material 17 interposed between the folds thereof, the object of this construction being to get a surface nearly equal to the oxidizable metal which surrounds it, thus making the galvanic current constant—that is, of uniform volume and tension, not subject to fluctuation.

20 indicates the zinc plate of the cells. The zinc plate has an elongated perforation 18 formed therein, through which the stem of the T-shaped copper plate passes, and also a depression 19, which is adapted to pass over the stem of the copper plate.

The stem of the T-shaped copper plate passes through perforations 18, and the zinc plate is then folded over the upper folded part of the copper plate and the dielectric absorbent material. The lower part of the stem of the T-shaped copper plate is bent approximately on itself, and said bent portion is slipped over one side of the zinc plate and through perforations 18, and the copper plate is then soldered or fastened in any suitable manner to the exterior surface of the zinc plate. The copper plate of one cell is electrically connected with the zinc plate of the other, thus forming a voltaic couple, transmitting the galvanic current and increasing the electro-motive force of said current in proportion to the number of cells used.

Any amount of dielectric absorbent material can be used, so as to hold enough of the oxidizable fluid in absorption to chemically affect the zinc and copper plates used.

By rolling or folding the zinc and copper plates each upon itself any amount of contact surface can be presented to the chemical action of the oxidizable fluid. The electro-motive force may also be increased by connecting any number of cells together.

Between each cell the copper plate has a small perforation formed therein, through which the wire spring-hook 7 passes. Said hook is electrically connected to the conducting-cords. This connection, as before stated, is made through small perforations 8 in the side of the rubber pocket situated directly above and over the perforations in the copper plate. By this means any number of cells may be used at a time, thereby increasing or diminishing the electro-motive force or electrical intensity, as desired.

The electrodes or contact-pieces 6 are made round or oval and firmly soldered or suitably attached to wire 14, through which connection is made for the current.

By slipping the clips and electrodes along the belt they may be adjusted to whatever portion of the body desired; or said electrodes may be placed on any part of the organism—head, feet, hand, &c.—and electrically connected with the battery by small connecting-cords.

Having fully described my invention, what I claim is—

1. In an electric belt, a voltaic couple composed of a zinc plate 20, provided with a perforation 18 and a depression 19, forming one element, a T-shaped copper plate provided with a perforation 8, and the stem of which bent upon itself and adapted to be slipped over one side of said zinc plate through perforation 18 forming the other element, and suitable layers of dielectric absorbent material to contain the exciting-fluid interposed between the folds of said copper and zinc plates, substantially as set forth.

2. A galvanic battery composed of cells 11, each having its copper element bent upon itself, so it can be directly slipped over the zinc element of an adjacent cell and secured thereto, perforations in said copper plates, spring-hooks 7, electrically secured to connecting-cords and adapted to pass through said perforations, whereby electrical connection is effected between said battery and said conducting-cords, substantially as set forth.

3. In an electric belt, the battery composed of cells each of which is made of a T-shaped copper plate, the upper part of which is folded or bent upon itself, with layers of dielectric absorbent material interposed between the folds thereof, a zinc plate provided with a perforation 18 and depression 19, wrapped around and forming the exterior covering of said cells, and the stem of said copper plate bent upon itself, whereby it can be slipped over said zinc plate, by which electrical connection is effected between said cells, substantially as set forth.

4. In an electric belt, a galvanic cell composed of a T-shaped copper plate, the upper part of which is folded upon itself, with layers of dielectric absorbent material containing the exciting-fluid interposed between the folds thereof, and the stem of said copper plate bent to receive the zinc element of an adjacent cell, and a zinc plate provided with a perforation 18 and depression 19, wrapped around the folded or bent portion of the copper plate, with a layer or layers of dielectric absorbent material containing the exciting-fluid interposed between said copper and zinc plates, substantially as set forth.

In testimony whereof I affix my signature in presence of two witnesses.

DUANE P. ANDRUS.

Witnesses:
C. K. JONES,
C. F. KEELER.